(12) United States Patent
Park et al.

(10) Patent No.: US 9,057,632 B2
(45) Date of Patent: Jun. 16, 2015

(54) APPARATUS AND METHOD FOR MEASURING FLOW RATE OF METER

(75) Inventors: Jae Sam Park, Incheon (KR); Byeong Hak Kang, Seoul (KR); Hun Cha, Gyeonggi-do (KR)

(73) Assignee: ONE-TL CO., LTD., Seoul (KR)

( * ) Notice: Subject to any disclaimer, the term of this patent is extended or adjusted under 35 U.S.C. 154(b) by 0 days.

(21) Appl. No.: 13/991,185

(22) PCT Filed: Dec. 2, 2011

(86) PCT No.: PCT/KR2011/009340
§ 371 (c)(1),
(2), (4) Date: Aug. 18, 2013

(87) PCT Pub. No.: WO2012/074340
PCT Pub. Date: Jun. 7, 2012

(65) Prior Publication Data
US 2013/0312538 A1    Nov. 28, 2013

(30) Foreign Application Priority Data
Dec. 3, 2010    (KR) .......................... 10-2010-0122492

(51) Int. Cl.
*G01F 1/06* (2006.01)

(52) U.S. Cl.
CPC . *G01F 1/06* (2013.01); *G01F 1/065* (2013.01)

(58) Field of Classification Search
USPC ..................................................... 73/861.87
See application file for complete search history.

(56) References Cited

U.S. PATENT DOCUMENTS

| 4,410,305 | A | * | 10/1983 | Shank et al. ................... 418/150 |
| 5,090,881 | A | * | 2/1992 | Suzuki et al. .................. 418/26 |
| 5,174,337 | A | * | 12/1992 | Dahlen et al. ............ 137/625.29 |

FOREIGN PATENT DOCUMENTS

| JP | 2002-039814 A | 2/2002 |
| KR | 10-0457454 B1 | 11/2004 |
| KR | 10-0622263 B1 | 9/2006 |

OTHER PUBLICATIONS

International Search Report for PCT/KR2011/009340.

* cited by examiner

*Primary Examiner* — Jewel V Thompson
(74) *Attorney, Agent, or Firm* — The PL Law Group, PLLC

(57) ABSTRACT

A water meter of the present invention may accurately measure a flow rate and reduce power consumption. The water meter includes a body including an inlet unit and an outlet unit, an impeller unit provided to rotate due to a fluid flowing in the body, a cover member that covers one side of the impeller unit and includes a guide groove formed therein, and sensors that are provided on one side and the other side of the cover member and are spaced apart from each other to face each other. The impeller unit includes blades interfering with the fluid, a shaft forming a rotational center of the blades, and a cut-off unit that extends from one side of the plurality of blades to be inserted into the guide groove, and selectively cuts off signal transmission between the plurality of sensors.

13 Claims, 9 Drawing Sheets

APPARATUS AND METHOD FOR MEASURING FLOW RATE OF METER

CROSS REFERENCE TO RELATED APPLICATIONS AND CLAIM OF PRIORITY

This patent application is a National Phase application under 35 U.S.C. §371 of International Application No. PCT/KR2011/009340, filed Dec. 2, 2011, which claims priority to Korean Patent Application No. 10-2010-0122492 filed Dec. 3, 2010, entire contents of which are incorporated herein by reference.

TECHNICAL FIELD

The present invention relates to an apparatus and method for measuring a flow rate of a meter, and more particularly, to an apparatus and method for accurately measuring a flow rate of a meter with low power consumption.

BACKGROUND ART

In general, a water meter is a device for measuring the amount of water supplied to a residential or commercial establishment from a water supply source. The amount of water used by the residential or commercial establishment is translated into a water bill issued to the residential or commercial establishment.

A water meter using a permanent magnet and a reed switch is used as a conventional water meter for measuring the amount of used water.

In detail, a meter using a reed switch is configured such that a permanent magnet is attached to a rotatable impeller and the reed switch is disposed outside the impeller. When the impeller and the permanent magnet rotate, the permanent magnet causes the reed switch to be selectively turned on or off. As the reed switch is turned on or off, electrical pulses are generated. The number of rotations of the impeller may be measured by counting the number of pulses.

The meter has a disadvantage in that since the reed switch operates due to a magnetic force, when an object having another magnetic force exists around the reed switch, the reed switch may not be smoothly turned on or off, thereby leading to an error in the pulses generated by the reed switch and failing to accurately measure a flow rate.

SUMMARY

The present invention is directed to providing an apparatus and method for accurately measuring a flow rate of a meter.

One aspect of the present invention provides an apparatus for measuring a flow rate of a meter, the apparatus including: a body that includes an inlet unit and an outlet unit; an impeller unit that is provided to rotate due to a fluid flowing in the body; a cover member that covers one side of the impeller unit and includes a guide groove formed therein; and a plurality of sensors that are provided on one side and the other side of the cover member and are spaced apart from each other to face each other, wherein the impeller unit includes: a plurality of blades that interfere with the fluid; a shaft that forms a rotational center of the plurality of blades; and a cut-off unit that extends from one side of the plurality of blades to be inserted into the guide groove, and selectively cuts off signal transmission between the plurality of sensors.

Another aspect of the present invention provides a method for measuring a flow rate of a meter which uses signals input/output by first and second sensors and is activated in preset cycles, the method including: outputting an on signal to the first sensor to enable the first sensor to transmit a signal; determining an initial on/off state of the second sensor by determining whether the signal transmitted by the first sensor is sent to the second sensor; changing the meter to an idle state; activating the meter due to an interruption of a timer or an external signal; and operating the first sensor, comparing a current on/off state of the second sensor with a previous on/off state of the second sensor, and selectively counting the number of rotations of the meter.

According to the one or more embodiments of the present invention, since the number of rotations of an impeller is selectively counted according to signals transmitted/received by a plurality of sensors, a flow rate may be accurately measured.

Also, since a signal transmitting unit is repeatedly turned on or off in predetermined cycles and thus does not need to be always turned on, power consumption may be reduced.

Moreover, sine a structure of a meter is simple and may be easily manufactured, manufacturing costs may be reduced.

Furthermore, since a method of controlling the meter is simple, reliability is high, and the risk of malfunction is low, the level of satisfaction a user feels about a product may be increased.

DETAILED DESCRIPTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Figure 1:
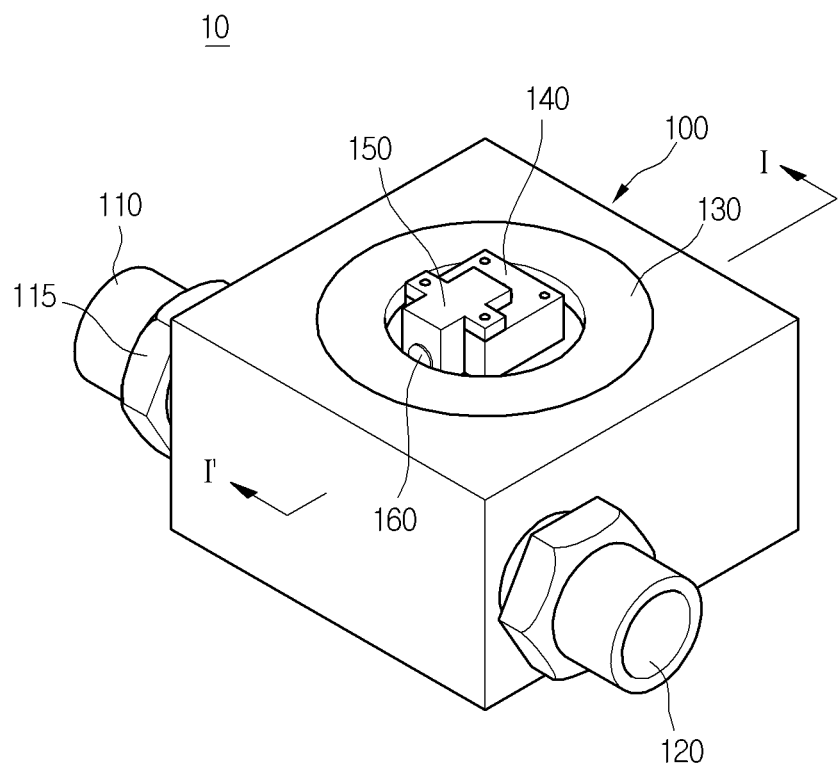
FIG. 1 is a perspective view illustrating a water meter according to an embodiment of the present invention.
Figure 2:
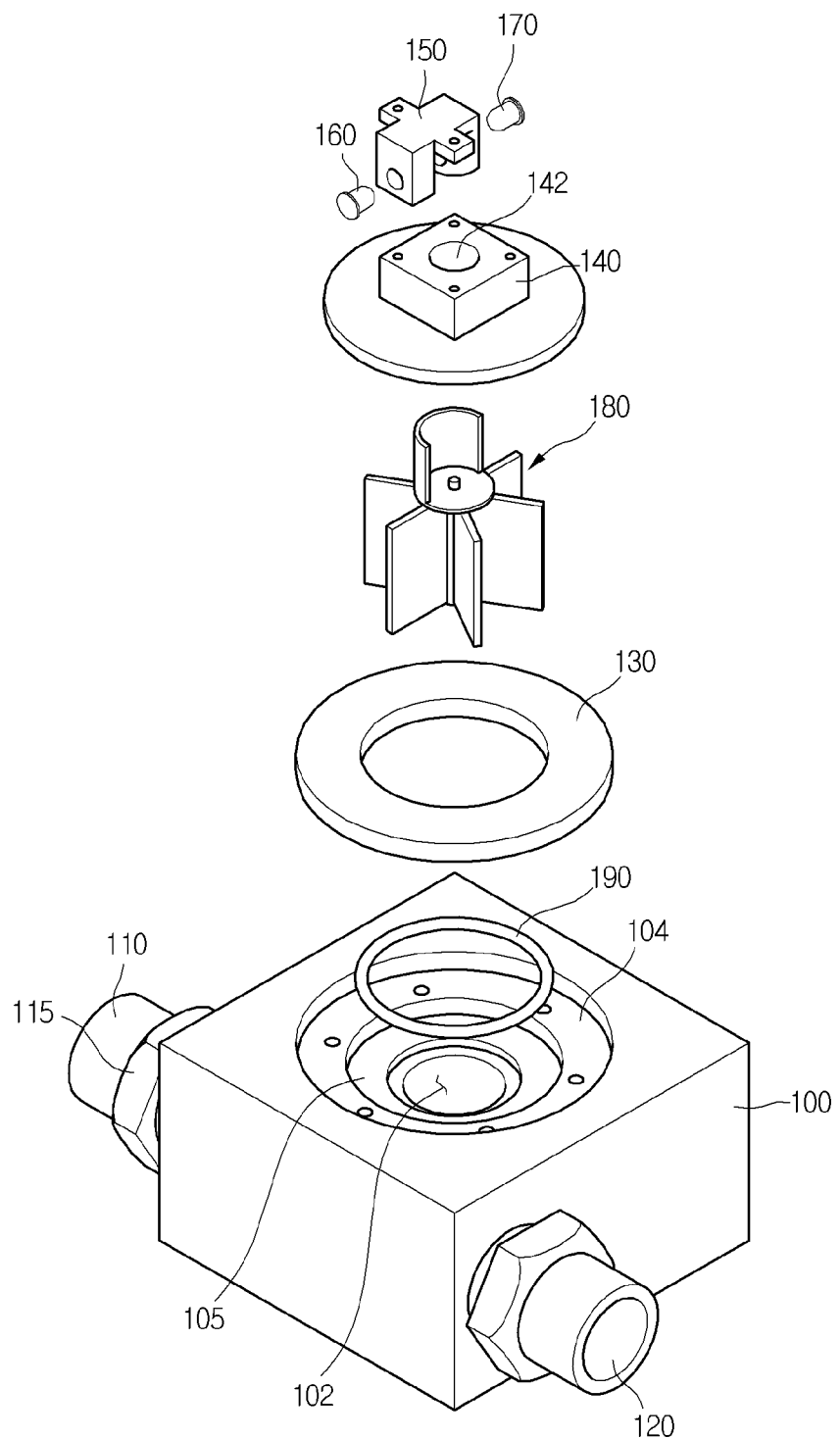
FIG. 2 is an exploded perspective view illustrating the water meter of FIG. 1.

FIG. 1 is a perspective view illustrating a water meter 10 according to an embodiment of the present invention. FIG. 2 is an exploded perspective view illustrating the water meter 10 of FIG. 1.

Referring to FIGS. 1 and 2, the water meter 10 includes a body 100 in which a receiving space is formed, an inlet unit 110 that is provided on one side of the body 100 and allows a fluid to be introduced therethrough, and an outlet unit 120 that is provided on the other side of the body 100 and allows the fluid to be discharged therethrough.

The fluid (for example, water) introduced through the inlet unit 110 passes through the body 100, and is discharged through the outlet unit 120 to the outside. The inlet unit 110 and the outlet unit 120 respectively include fixing nuts 115 for fixing the inlet unit 110 and the outlet unit 120 to the body 100.

The water meter 10 further includes a sensor support unit 150 that supports a plurality of sensors, that is, a first sensor 160 and a second sensor 170, and a first cover member 130 and a second cover member 140 that cover an open top surface of the body 100.

The plurality of sensors include the first sensor 160 and the second sensor 170. The first sensor 160 may be a signal transmitting unit that transmits a signal, and the second sensor 170 may be a signal receiving unit that receives a signal. For example, the first sensor may be a light-emitting diode (LED) that transmits an optical signal, and the second sensor 170 may be a photo transistor that transmits an optical signal. Alternatively, the second sensor 170 may be a signal transmitting unit, and the first sensor 160 may be a signal receiving unit.

The first cover member 130 has substantially an annular shape and is mounted on the body 100. A first mount portion 104 on which the first cover member 130 is mounted is formed in the body 100. The first mount portion 104 is formed by being recessed downward from the top surface of the body 100.

The second cover member 140 is disposed in the first cover member 130, and is mounted on the body 100. A second mount portion 105 on which the second cover member 140 is mounted is formed in the body 100. The second mount portion 105 is formed by being recessed downward from the first mount portion 104.

Due to the first mount portion 104 and the second mount portion 105, the top surface of the body 100 may be downwardly stepped. An edge portion of a top surface of the second cover member 140 may be pressed down by the first cover member 130 (see FIG. 5).

A sensor receiving unit 142 in which the second sensor 170 is received is formed on the second cover member 140. The sensor receiving unit 142 may be formed by being recessed downward from the top surface of the second cover member 140 to be inserted into the second cover member 140. The first sensor 160 is disposed outside the second cover member 140, and the second sensor 170 is disposed inside the second cover member 140, that is, in the sensor receiving unit 142. However, the present embodiment is not limited thereto, and the second sensor 170 may be disposed outside the second cover member 140, and the first sensor 160 may be disposed inside the second cover member 140, that is, in the sensor receiving unit 142.

An impeller unit 180 which is rotatable is inserted into the body 100. At least a portion of the impeller unit 180 is inserted into the second cover member 140 and extends downward. An impeller insertion unit 102 into which the impeller unit 180 is inserted is formed in the body 100. The impeller insertion unit 102 may be formed by being recessed downward from an inside of the second mount portion 105.

A sealing member 190 for preventing the fluid in the body 100 from leaking to the outside is provided outside the impeller insertion unit 102. In a state where the second cover member 140 is coupled to the body 100, the sealing member 190 may be closely attached to a bottom surface of the second cover member 140 (see FIG. 5).

Figure 3:
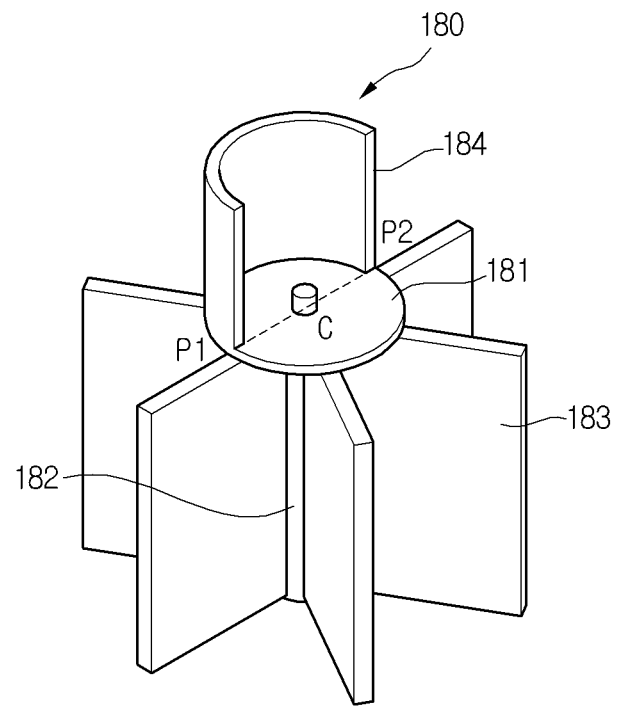
FIG. 3 is a perspective view illustrating an impeller unit according to an embodiment of the present invention.

FIG. 3 is a perspective view illustrating the impeller unit 180 according to an embodiment of the present invention.

Referring to FIG. 3, the impeller unit 180 according to an embodiment of the present invention includes an impeller body 181, a plurality of blades 183 that are provided under the impeller body 181 and interfere with the fluid flowing in the body 100 to generate a rotational force, a shaft 182 that forms a rotational center of the blades 183, and a cut-off unit 184 that extends upward from the impeller body 181.

The impeller body 181 has a disk shape, and the shaft 182 is inserted into the impeller body 181 and extends downward. An upper end portion of the shaft 182 may protrude upward from the impeller body 181. The plurality of blades 183 are spaced apart from one another and are coupled to an outer circumferential surface of the shaft 182. The plurality of blades 183 may be coupled at regular intervals to the outer circumferential surface of the shaft 182.

The cut-off unit 184 is coupled to an edge portion of a top surface of the impeller body 181, and is rounded to have the same curvature as that of the impeller body 181. The cut-off unit 184 may be formed by extending upward from a portion of an outer circumferential surface of the impeller body 181.

In detail, the cut-off unit 184 extends upward from about ½ of the edge portion of the top surface of the impeller body 181. That is, assuming that the top surface of the impeller body 181 having a circular shape spans 360 degrees about the shaft 182, the cut-off unit 184 spans about 180 degrees of the top surface. In other words, a virtual line that connects a point P1 at which one end of the cut-off unit 184 is formed and a second point P2 at which the other end of the cut-off unit 184 is formed crosses a center C of the shaft 182.

When the fluid is introduced through the inlet unit 110 and flows toward the outlet unit 120, the blades 183 interfere with the fluid. In this case, the impeller body 181, the blades 183, and the cut-off unit 184 rotate about the shaft 182.

Figure 4:
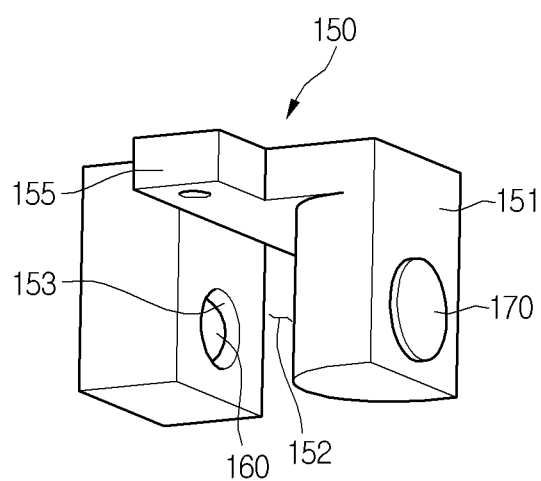
FIG. 4 is a perspective view illustrating a sensor support unit according to an embodiment of the present invention.

FIG. 4 is a perspective view illustrating the sensor support unit according to an embodiment of the present invention.

Referring to FIG. 4, the sensor support unit 150 includes a support body 151 to which the first and second sensors 160 and 170 are coupled, a cover receiving unit 152 that is defined as a predetermined space formed in the support body 151 and allows at least a portion of the second cover member 140 to be disposed therein, and a cover coupling unit 155 to which the second cover member 140 is coupled.

A plurality of sensor insertion units 153 into which the first sensor 160 and the second sensor 170 are respectively inserted are formed in the support body 151.

The cover receiving unit 152 may be defined between the plurality of sensor insertion units 153. The first sensor 160 and the second sensor 170 may face each other about the cover receiving unit 152 in a state where the first sensor 160 and the second sensor 170 are coupled to the sensor insertion units 153.

The cover coupling unit 155 may extend from both sides of the support body 151, and may be coupled to the top surface of the second cover member 140. A coupling hole into which a coupling member (not shown) is inserted may be formed in the cover coupling unit 155.

Figure 5:
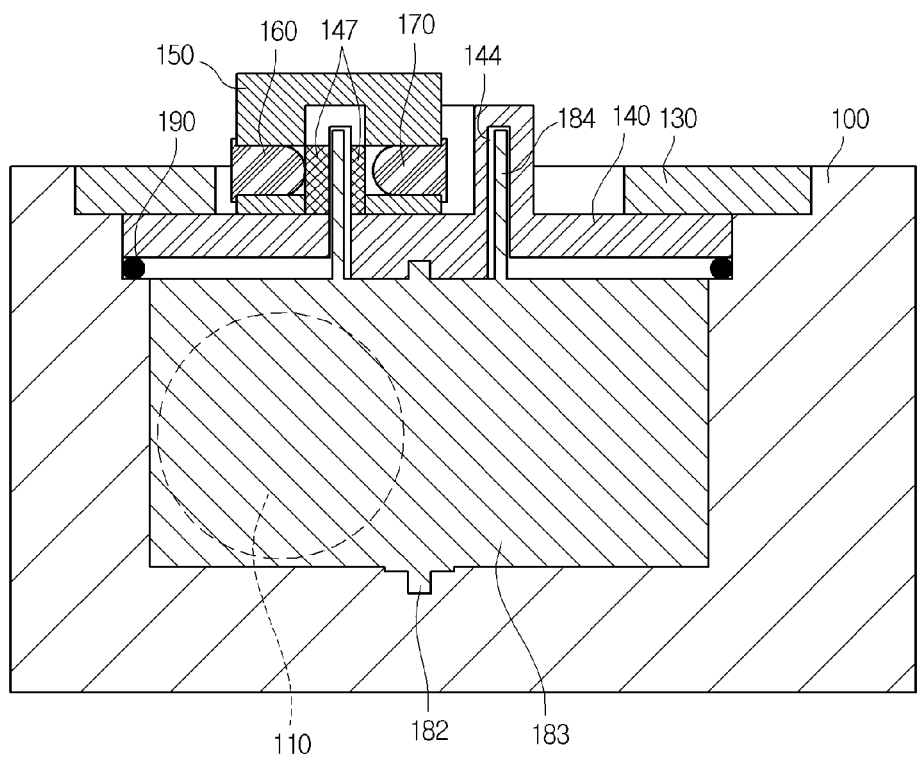
FIG. 5 is a cross-sectional view taken along line I-I' of FIG. 1.

FIG. 5 is a cross-sectional view taken along line I-I' of FIG. 1.

Referring to FIG. 5, a guide groove 144 into which the cut-off unit 184 is inserted is formed in the second cover member 140. The guide groove 144 may be rounded to have the same curvature as that of the cut-off unit 184 so that the cut-off unit 184 may be completely inserted into the guide groove 144. The guide groove 144 may have substantially a cylindrical shape so that the cut-off unit 184 may freely rotate. The cut-off unit 184 may be inserted upward through the guide groove 144 into the second cover member 140. The guide groove 144 may be formed to be a little bit larger than the cut-off unit 184 in order for the impeller unit 180 or the cut-off unit 184 not to interfere with the second cover member 140.

A transmission unit 147 for enabling a signal (for example, optical signal transmission) to be transmitted between the first sensor 160 and the second sensor 170 is formed on a portion of the second cover member 140 on which the cover receiving unit 152 is disposed. The transmission unit 147 may be formed of a transparent material, and a signal transmitted by the first sensor 160 may be transmitted through the transmission unit 147 to the second sensor 170.

When the cut-off unit 184 is disposed between the first and second sensors 160 and 170 as shown in FIG. 5, signal transmission between the first and second sensors 160 and 170 may be cut off, which will be explained below with reference to drawings.

Although not shown, a through-hole (not shown) for smoothly transmitting/receiving a signal may be formed in the transmission unit 147, and the entire transmission unit 147 may be a through-hole.

Figure 6:
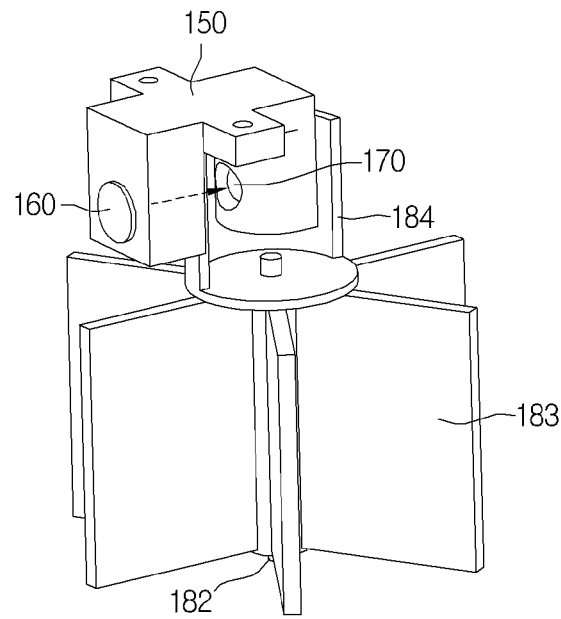
FIG. 6 is a view illustrating a state where signals are transmitted/received by a plurality of sensors, according to an embodiment of the present invention.
Figure 7:
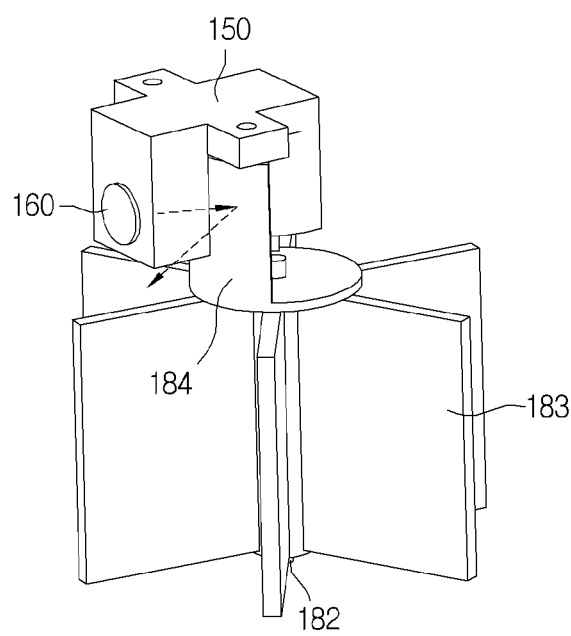
FIG. 7 is a view illustrating a state where signals transmitted/received by the plurality of sensors are cut off, according to an embodiment of the present invention.
Figure 8:
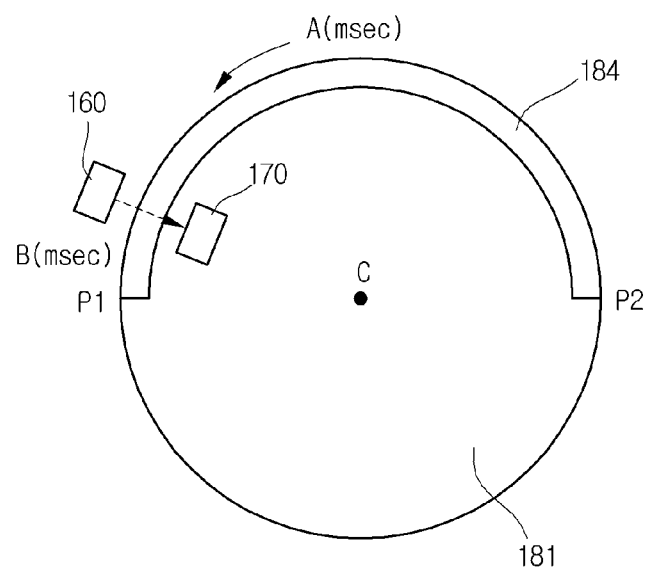
FIG. 8 is a schematic view illustrating a state where a cut-off unit and the plurality of sensors operate, according to an embodiment of the present invention.

FIG. 6 is a view illustrating a state where signals are transmitted/received by a plurality of sensors, according to an embodiment of the present invention. FIG. 7 is a view illustrating a state where signals transmitted/received by the plurality of sensors are cut off, according to an embodiment of the present invention. FIG. 8 is a schematic view illustrating a state where the cut-off unit and the plurality of sensors operate, according to an embodiment of the present invention.

Referring to FIGS. 6 through 8, when the impeller unit 180 rotates, a signal transmitted by the first sensor 160 is selectively transmitted to the second sensor 170.

When the cut-off unit 184 is not disposed between the first sensor 160 and the second sensor 170 as shown in FIG. 6, a signal transmitted by the first sensor 160 is sent to the second sensor 170.

However, when the cut-off unit 184 is disposed between the first sensor 160 and the second sensor 170 as shown in FIG. 7, a signal transmitted by the first sensor 160 is cut off by the cut-off unit 184 and is not sent to the second sensor 170.

That is, as shown in FIG. 8, when a signal transmitted by the first sensor 160 is cut off by the cut-off unit 184, the second sensor 170 changes to an off state. When the impeller unit 180 rotates and the cut-off unit 184 is not disposed between the first sensor 160 and the second sensor 170, a signal transmitted by the first sensor 160 is sent to the second sensor 170, and thus the second sensor 170 changes to an on state.

A rotation period of the impeller unit 180 may be expressed as A (msec). The value "A" may be set based on a maximum rotation speed of the impeller unit 180 when the fluid flows. For example, when a maximum rotation speed of the impeller unit 180 or the cut-off unit 184 is 20 rps, that is, when the impeller unit 180 or the cut-off unit 184 rotates 20 times per second, a time (period) taken for one rotation may be about 50 msec. In this case, the value A is 50 msec.

A period taken for a signal to be transmitted by the first sensor 160 may be expressed as B (msec). A period taken for a signal to be transmitted by the first sensor 160 may correspond to a period taken for an on signal to be output from a control unit 200 (see FIG. 9).

The value "B" may be less than A/2. For example, when the value "A" is 50 msec, the value "B" may be 20 msec less than 25 msec. That is, a signal generation period is less than half a rotation period of the impeller unit 180.

As described above, since a signal generation period of the first sensor is less than half a rotation period of the impeller unit, the first sensor 160 transmits a signal 2 times or more (for example, two times, three times, or four times) per rotation of the impeller body 181.

Since a circumferential length of the cut-off unit 184 is about ½ of a circumferential length of the impeller body 181, when the impeller body 181 rotates one time, each of a case where a signal transmitted by the first sensor 160 is sent to the second sensor 170 (an on state of the second sensor) and a case where a signal transmitted by the first sensor 160 is not sent to the second sensor 170 (an off state of the second sensor) occurs at least one time.

As described above, the second sensor 170 may have an on state two or more times (for example, two times, three times, or four times) and an off state two or more times (for example, two times, three times, or four times) when the impeller body 181 rotates one time.

In short, the number of measurement times of an off state or an on state of the second sensor 170 per rotation of the impeller unit 180 may vary according to a rotation speed of the impeller unit 180.

An apparatus and method for measuring a flow rate to accurately measure the number of rotations of the impeller unit 180 will be explained with reference to the drawings.

Figure 9:
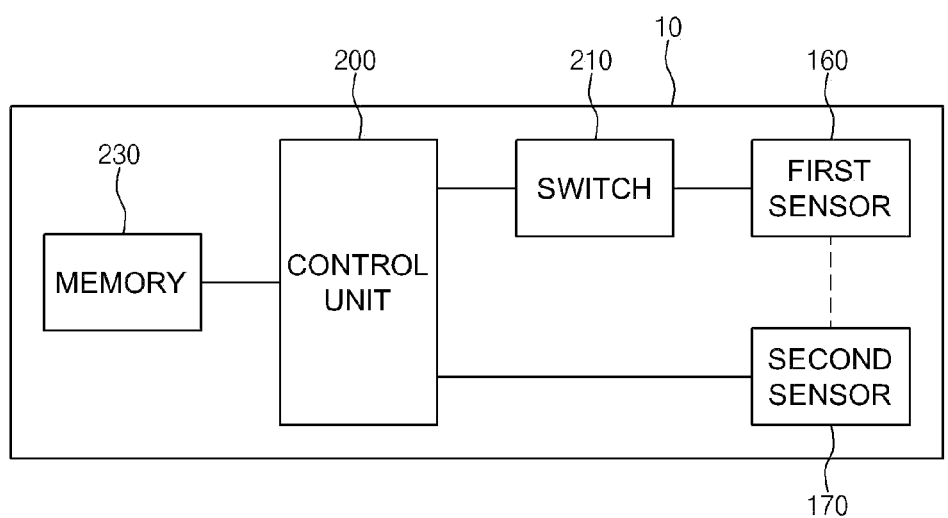
FIG. 9 is a block diagram illustrating a structure of the water meter, according to an embodiment of the present invention.
Figure 10:
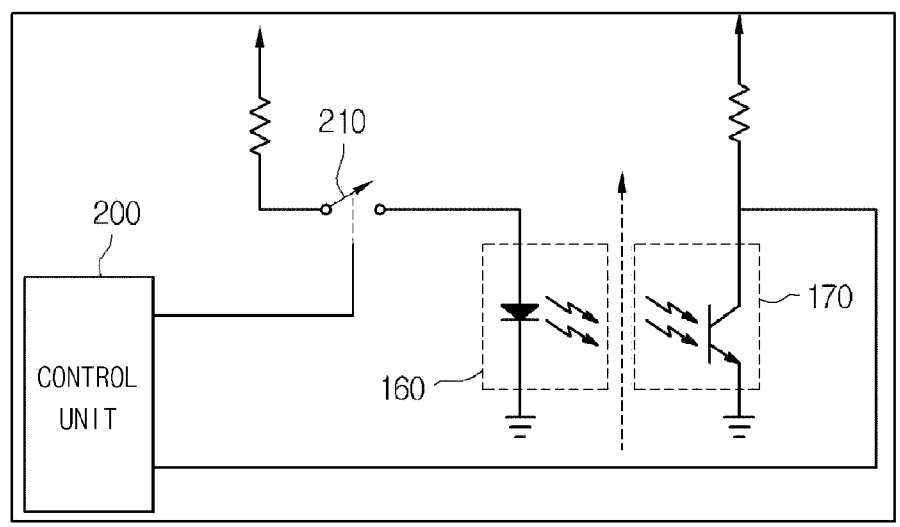
FIG. 10 is a circuit diagram illustrating an operation performed by the water meter to transmit/receive a signal, according to an embodiment of the present invention.

FIG. 9 is a block diagram illustrating a structure of the water meter, according to an embodiment of the present invention. FIG. 10 is a circuit diagram illustrating an operation performed by the water meter to transmit/receive a signal, according to an embodiment of the present invention. FIG. 9 illustrates a structure for transmitting a signal between the first sensor 160 and the second sensor 170 and the control unit of the water meter. FIG. 10 illustrates an operation performed by the control unit to transmit/receive a signal.

Referring to FIGS. 9 and 10, the water meter 10 according to an embodiment of the present invention includes the first sensor 160 and the second sensor 170, a switch 210 that is selectively turned on or off to enable the first sensor unit 160 to transmit a signal, the control unit 200 that outputs a signal for turning on or off the switch 210, and a memory 230 that stores information about on/off states of the first and second sensors 160 and 170.

As shown in FIG. 10, the control unit 200 outputs a switch on signal in predetermined cycles, and accordingly the switch 210 is turned on in the predetermined cycles. When the switch 210 is turned on, the first sensor 160 generates a signal to be transmitted.

When the cut-off unit 184 is disposed between the first sensor 160 and the second sensor 170, the second sensor 170 is turned off and a predetermined signal (for example, a high signal) is input to the control unit 200. However, when the cut-off unit 184 is not disposed between the first sensor 160 and the second sensor 170, the second sensor 170 is turned on and a predetermined signal (for example, a low signal) is input to the control unit 200.

The control unit 200 controls the number of rotations of the impeller unit 180 to be counted by using a rotation number counting method of the present invention which will be explained below, according to whether the high signal or the low signal is input from the second sensor 170.

Figure 11:
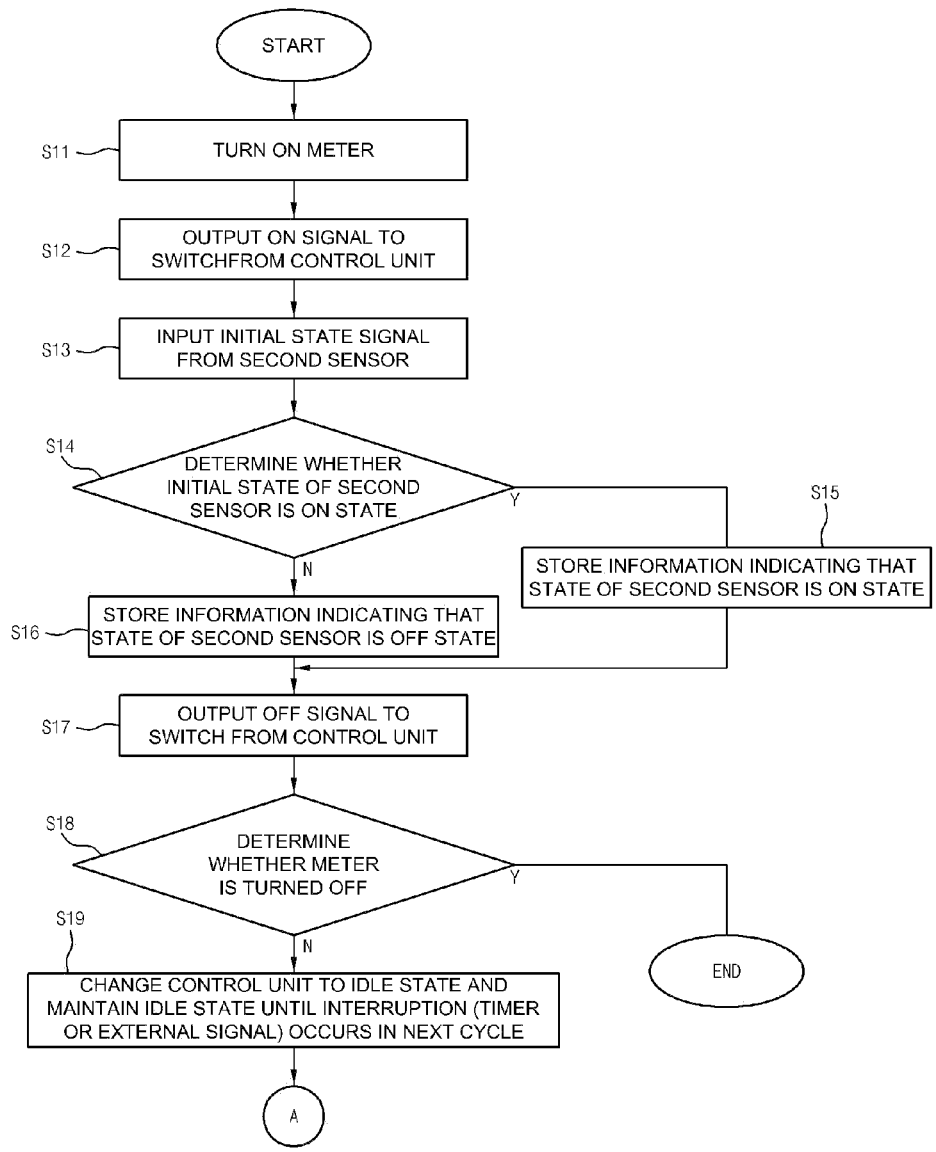
FIGS. 11 and 12 are flowcharts illustrating a method of controlling the number of rotations of a water meter to be counted, according to an embodiment of the present invention.
Figure 12:
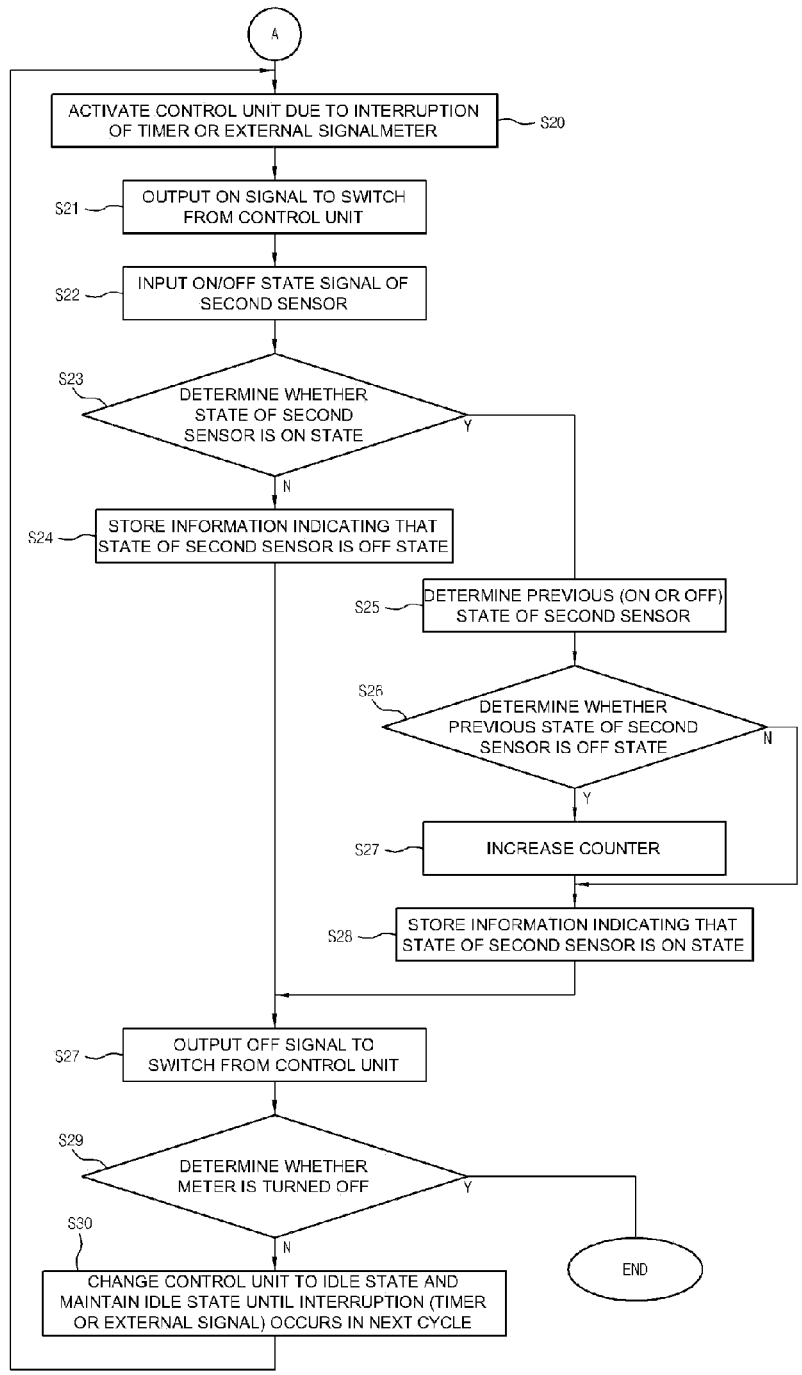

FIGS. 11 and 12 are flowcharts illustrating a method of controlling the number of rotations of a water meter to be counted, according to an embodiment of the present invention. A rotation number counting method of the water meter according to an embodiment of the present invention will be explained with reference to FIGS. 11 and 12.

Referring to FIG. 11, the meter is turned on (S11). The control unit 200 outputs an on signal to the switch 210 to operate the first sensor 160, and thus the switch 210 is turned on to enable the first sensor 160 to transmit a signal (S12).

As the first sensor 160 transmits the signal, an initial state of the second sensor 170 is determined. That is, it is determined whether a signal input from the second sensor 170 to the control unit 200 is an on signal or an off signal. In other words, before the meter operates, it is determined whether the cut-off unit 184 is disposed between the first and second sensors 160 and 170.

If the cut-off unit 184 is disposed between the first and second sensors 160 and 170, the second sensor 170 is in an off state. If the cut-off unit 184 is not disposed between the first and second sensors 160 and 170, the second sensor 170 is in an on state. As such, an initial on/off state of the second sensor 170 may be determined according to a position of the cut-off unit 184 (S13).

When it is determined that the initial state of the second sensor 170 is an on state (S14), information indicating that the state of the second sensor 170 is an on state is stored in the memory 230 of the control unit 220 (S15). When it is determined that the initial state of the second sensor 170 is an off state, information indicating that the state of the second sensor 170 is an off state is stored in the memory 230 (S16).

Next, the control unit 200 outputs an off signal to the switch 210 to stop the operation of the first sensor 160 (S17). Accordingly, the switch 210 is turned off and the signal transmitted by the first sensor 160 is cut off.

It is determined whether the meter is turned off. When the meter is not turned off, the control unit changes to an idle state. The idle state may be a state in which the meter may be activated at a next predetermined time (cycle) due to an interruption of a timer or an external signal (S18 and S19).

Referring to FIG. 12, the control unit 200 may be activated due to an external periodical signal (external interruption) or when a preset time passes (timer interruption) (S20).

When the control unit 200 is activated, the control unit 200 outputs an on signal to the switch 210 to operate the first sensor 160 (S21). Accordingly, the switch 210 is turned on to enable the first sensor 160 to transmit a signal.

As the first sensor 160 transmits the signal, a current state of the second sensor 170 is determined (S22). That is, it is determined whether a current signal input from the second sensor 170 to the control unit 200 is an on signal or an off signal according to whether the cut-off unit 184 is currently disposed between the first and second sensors 160 and 170 (S22 and S23).

When the current state of the second sensor 170 is an off state, information indicating that the current state of the second sensor 170 is an off state is stored in the memory 230 (S24). On the contrary, when the current state of the second sensor 170 is an on state, a previous state of the second sensor (on/off state) is determined (S25 and S26).

When the previous state of the second sensor 170 is an off state, a counter for measuring the number of rotations of the impeller unit 180 is increased (n=n+1) (S27). However, when the previous state of the second sensor 170 is an on state, information indicating that the state of the second sensor 170 is an on state is stored without increasing the counter (S28).

Here, "the previous state of the second sensor" is defined as follows.

When an initial interruption occurs in FIG. 12, "the previous state of the second sensor" refers to a state of the second sensor 170 stored in the memory 230 in operation S15 or S16 of FIG. 11.

When an interruption occurs at a next predetermined time, "the previous state of the second sensor" refers to a state of the second sensor 170 stored in the memory 230 in a previous cycle, that is, operation S24 or S28, of FIG. 12.

After information indicating that the state of the second state 170 is an on state is stored in the memory 230 in operation S28, the control unit 200 outputs an off signal to the switch 210 to stop the operation of the first sensor 160 (S29). Accordingly, the switch 210 is turned off to cut off the signal transmitted by the first sensor 160.

It is determined whether the meter is turned off, and when it is determined that the meter is not turned off, the control unit 200 enters an idle state (S30 and S31). The control unit 200 changes to a state where the control unit 200 may be activated at a next time (cycle) due to an interruption of a timer or an external signal (S20).

According to the method of measuring a flow rate, the number of rotations of the impeller unit may be counted only when the second sensor 170 changes from an off sate to an on state by determining a state of the second sensor 170. As a result, when the impeller unit rotates one time, the number of rotations may be exactly increased by one.

Alternatively, the number of rotations of the impeller unit may be increased only when the second sensor 170 changes from an on state to an off state.

As described above, although the number of measurement times of an off state or an on state of the second sensor 170 per rotation of the impeller unit 180 varies according to a rotation speed of the impeller unit 180, since a counter is increased by only one per rotation of the impeller unit, the number of rotations of the impeller unit may be accurately counted.

Also, the first and second sensors 160 and 170 are not always maintained in on states. A signal of the first sensor 160 is turned on in predetermined cycles and it is determined whether a signal from the second sensor 170 is turned on or off only when the first sensor 160 is turned on. As a result, a time taken for the first and second sensors 160 and 170 to use current is reduced, and thus current consumption is reduced, which is advantageous for a meter using a battery.

INDUSTRIAL APPLICABILITY

According to an apparatus for measuring a flow rate of a meter according to the present embodiment, since the number of rotations of an impeller is selectively counted according to signals transmitted/received by a plurality of sensors and thus a flow rate is accurately measured, significant industrial applicability is achieved.

The invention claimed is:

1. An apparatus for measuring a flow rate of a meter, comprising:
a body that includes an inlet unit and an outlet unit;
an impeller unit that is provided to rotate due to a fluid flowing in the body;
a cover member that covers one side of the impeller unit and has a guide groove formed therein; and
a plurality of sensors that are provided on one side and the other side of the cover member and are spaced apart from each other to face each other, wherein the impeller unit comprises:
  a plurality of blades that interfere with the fluid;
  a shaft that forms a rotational center of the plurality of blades; and
  a cut-off unit that extends from one side of the plurality of blades to be inserted into the guide groove, and selectively cuts off signal transmission between the plurality of sensors.

2. The apparatus of claim 1, wherein the plurality of sensors comprise a signal transmitting unit and a signal receiving unit,
  wherein when the cut-off unit is disposed between the signal transmitting unit and the signal receiving unit while the impeller unit rotates, signal transmission from the signal transmitting unit to the signal receiving unit is cut off.

3. The apparatus of claim 1, further comprising:
  a switch that is turned on or off to operate the plurality of sensors; and
  a control unit that outputs an on signal to the switch.

4. The apparatus of claim 3, wherein a period of the on signal output by the control unit to the switch is less than ½ of a rotation period of the impeller unit.

5. The apparatus of claim 1, wherein a virtual line that connects one end and the other end of the cut-off unit crosses a center of the shaft.

6. The apparatus of claim 1, wherein the cut-off unit is rounded to have a preset curvature.

7. The apparatus of claim 1, wherein the plurality of sensors comprise:
  a first sensor that is disposed outside the cover member; and
  a second sensor that is received in the cover member.

8. The apparatus of claim 7, wherein the cover member comprises a transmission unit that is disposed between the first sensor and the second sensor and enables a signal to be transmitted from the first sensor to the second sensor.

9. The apparatus of claim 3, wherein the plurality of sensors comprise:
  a first sensor that transmits a preset signal according to the on signal output from the control unit; and
  a second sensor that is selectively turned on or off according to whether a signal transmitted by the first sensor is cut off by the cut-off unit.

10. The apparatus of claim 9, wherein assuming that an off state or an on state of the second sensor is measured per rotation of the impeller unit for a plurality of times according to a rotation speed of the impeller unit, only when the second sensor changes from the one state to the off state or from the off state to the on state, the control unit counts the number of rotations of the impeller unit.

11. The apparatus of claim 4, wherein the control unit is maintained in an idle state until a preset period passes after turning on the switch and receiving an on or off state of the second sensor.

12. A method for measuring a flow rate of a meter which uses signals input/output by first and second sensors and is activated in preset cycles, the method comprising:
  outputting an on signal to the first sensor to enable the first sensor to transmit a signal;
  determining an initial on/off state of the second sensor by determining whether the signal transmitted by the first sensor is sent to the second sensor;
  changing the meter to an idle state;
  activating the meter due to an interruption of a timer or an external signal; and
  operating the first sensor, comparing a current on/off state of the second sensor with a previous on/off state of the second sensor, and selectively counting the number of rotations of the meter.

13. The method of claim 12, wherein the number of rotations of the meter is counted only when the second sensor changes from the on state to the off state or from the off state to the on state.

* * * * *